United States Patent
Tironi Gallardo

(10) Patent No.: US 10,173,940 B2
(45) Date of Patent: Jan. 8, 2019

(54) METHOD AND LIQUID COMPOUND THAT IMPROVES THE EFFICIENCY OF AMMONIACAL NITROGENATED FERTILISERS AND THE AMMONIUM PRESENT IN THE GROUND

(71) Applicant: TIVAR HELICOPTEROS, ASESORIAS E INVERSIONES LIMITADA, Quillota (CL)

(72) Inventor: Nicolas Ivan Tironi Gallardo, Quillota (CL)

(73) Assignee: TIVAR HELICOPTEROS, ASESORIAS E INVERSIONES LIMITADA, Quillota (CL)

( * ) Notice: Subject to any disclaimer, the term of this patent is extended or adjusted under 35 U.S.C. 154(b) by 179 days.

(21) Appl. No.: 14/907,332

(22) PCT Filed: Dec. 24, 2013

(86) PCT No.: PCT/CL2013/000096
§ 371 (c)(1),
(2) Date: Jan. 25, 2016

(87) PCT Pub. No.: WO2015/013834
PCT Pub. Date: Feb. 5, 2015

(65) Prior Publication Data
US 2016/0168042 A1 Jun. 16, 2016

(30) Foreign Application Priority Data
Jul. 30, 2013 (CL) .................................. 2188-2013

(51) Int. Cl.
| | | |
|---|---|---|
| *C05C 1/00* | (2006.01) | |
| *C05G 3/08* | (2006.01) | |
| *C05B 17/00* | (2006.01) | |
| *C05C 9/00* | (2006.01) | |
| *C05F 11/10* | (2006.01) | |

(52) U.S. Cl.
CPC ................ *C05G 3/08* (2013.01); *C05B 17/00* (2013.01); *C05C 1/00* (2013.01); *C05C 9/00* (2013.01); *C05F 11/10* (2013.01); *Y02P 60/218* (2015.11)

(58) Field of Classification Search
None
See application file for complete search history.

(56) References Cited

U.S. PATENT DOCUMENTS

| | | | | |
|---|---|---|---|---|
| 2,163,065 | A | * | 6/1939 | Rosenstein ............. C05B 17/00 405/39 |
| 3,494,757 | A | | 2/1970 | Osborne |
| 3,635,690 | A | * | 1/1972 | Griffith .................... C05B 7/00 71/1 |
| 4,036,627 | A | | 7/1977 | Funk |
| 4,356,021 | A | | 10/1982 | Kenton |
| 5,372,626 | A | | 12/1994 | Zivion et al. |
| 5,435,821 | A | | 7/1995 | Duvdevani et al. |
| 5,725,630 | A | | 3/1998 | Roberts et al. |
| 5,997,600 | A | | 12/1999 | Dean |

FOREIGN PATENT DOCUMENTS

| | | |
|---|---|---|
| CN | 101450880 B | 6/2009 |
| CN | 102311388 A | 1/2012 |
| DE | 159804 | 2/1971 |
| ES | 2259908 | 10/2006 |
| ES | 2288416 | 1/2008 |
| ES | 2378737 T3 | 4/2012 |
| FR | 2599736 | 12/1987 |

OTHER PUBLICATIONS

International Search Report prepared by the Spanish Patent and Trademark Office dated Mar. 5, 2014, for International Application No. PCT/CL2013/000096.
Database WPI, week 201271, Thomson Scientific, London GB, [Retrieved on Feb. 28, 2014] Retrieved from EPOQUE, Accession No. 2009-K70889 & CN 1014508808 B (Shenyang Applied Ecology) Jun. 6, 2012.
Database WPI, week 201282, Thomson Scientific, London GB, [Retrieved on May 3, 2014] Retrieved from EPOQUE, Accession No. 2012-B61086 & CN 102311388 A (LINW-I) Nov. 1, 2012.

* cited by examiner

*Primary Examiner* — Wayne A Langel
(74) *Attorney, Agent, or Firm* — Sheridan Ross P.C.

(57) ABSTRACT

The invention relates to a method for producing a liquid compound and to the compound used to improve the results of the application of ammoniacal nitrogenated fertilizers to crops requiring same and the ammonium present in the ground, said compound being a mixture consisting mainly of 3.5 DMPP as a nitrification inhibitor, phosphorus, the main function of which is to participate in all of the processes and energetic reactions of the crop, and amino acids winch are synthesized by the plants in enzymatic reactions generated by means of the animation, where absorbed ammonium salts and organic acids are produced.

8 Claims, No Drawings

METHOD AND LIQUID COMPOUND THAT IMPROVES THE EFFICIENCY OF AMMONIACAL NITROGENATED FERTILISERS AND THE AMMONIUM PRESENT IN THE GROUND

CROSS REFERENCE TO RELATED APPLICATIONS

This application is a national stage application under 35 U.S.C. 371 and claims the benefit of PCT Application No. PCT/CL2013/000096 having an international filing date of 24 Dec. 2013, which designated the United States, which PCT application claimed the benefit of Chilean Patent Application No. 2188-2013 filed 30 Jul. 2013, the disclosure of each of which are incorporated herein by reference.

The present application relates generally to the field of chemical fertilizers. Specifically, it is a product and a method which improves the use of the ammoniacal nitrogen fertilizers and the ammonium present in the ground, to make more efficient the absorption of a particular fertilizer applied to the ground by the plant.

BACKGROUND OF THE INVENTION

Nitrogen, carbon, hydrogen, oxygen, phosphorus and sulphur are some of the essential building blocks for all living beings. Grounds contain all of these elements in natural form, in addition to other macro and micronutrients which are needed for plant growth. Typically, such elements are not present in the ground in sufficient quantity or in forms that can maintain nutrition, growth and maximum yield of plants or crops. In order to overcome these deficiencies, fertilizers are often added to the ground with certain nutrients in amounts and specific ways, thereby enriching the growth medium either ground or substrate. With regard to nitrogen fertilization, plants can absorb nitrogen as ammonia or nitrate, both forms present in the ground but with dynamic and different benefits. Nitrogen, as any other nutrient, is force, yield and fruit quality determining. Inorganic nitrogen forms in the ground, and only the ammonium nitrate are of importance in agricultural nutrition. The ammonia fertilizer to be applied to the ground are subjected to the process of nitrification (nitrate in ammonia conversion) product of bacteria which are found naturally in grounds.

Under field conditions, nitrification proceeds very rapidly and the dominant form of nitrogen in ground is nitrate. From the plant and environmental point of view, ammonium nitrate is preferable regarding if it is available, but its nitrite and nitrate transformation is very fast. Once in the root, the ammonia passed directly to the amino acid form, but nitrate must be reduced ($NO_3^- + 8H^+ + 8e^- \rightarrow NH_3 + 2H_2O + OH^-$). When it is fertilized with an ammonia source and it is near the root, its absorption is very fast. Ammonium cause an increase in cytokinins hormones of plant and promotes more floral initiation than nitrate. However, the nitrate absorption stimulates the cations uptake, while the ammonia absorption inhibited this absorption.

Due to the ground dynamics of this nutrient it is susceptible to losses, which has a human health, environment and productivity impact. These losses are mainly produced by leaching, denitrification and volatilization. Leaching causes heavy pollution of ground and surface waters which causes in the environment an excessive algae growth in streams and health problems in humans such as gastric cancer and metahemoglobinemoa. Denitrification and volatilization cause an ozone increased ($O_3$) in the troposphere (NO), reduced of the atmospheric visibility, increased the acid rain, $O_3$ decreased in the stratosphear ($N_2O$) and global warming.

The nitrate form nitrogen is very soluble and because of the nitrate ion negatively charged it cannot be absorbed into the clay-humic complex ground and it is lost through leaching. Nitrogen in the urea form, having no charge, while it does not transform is subjected to the same leaching process. Only the nitrogen in the form of ammonia, may be retained in the ground clay-humic complex. Therefore, search techniques that reduce nitrogen losses and make more efficiently the use of nitrogen fertilizers is one of the priority challenges of the fertilizer industry worldwide There are tools and technologies that enable a more efficient and safe nitrogen use, they are aimed that in the moment of fertilizing settings that balance the plants requirements with fertilizer applications are applied, among them we found the fertilization splitting, fertigation, fertilization according to plant physiology, slow release fertilizers, and the use of inhibitors of processes, such as nitrogenous inhibitors.

The state of the art considers four types of products that make more efficient nitrogen fertilization 1. Slow and/or controlled release fertilizers, are fertilizers that containing a plant nutrient in a way that slows or dosed their availability and use after application, dosing for months the nutrients supply, reducing toxicity gradually through the slow delivery of salts and allowing the major part of the fertilizer without causing loss or phytotoxicity.

2. Slow dissolution and decomposition Molecules are urea condensation products and its aldehydes: Urea-formaldehyde (UF) 38% N; Urea-isobutyraldehyde (IBDU®) 32% N; Crotonyl diurea (CDU®) 32.5% N. The slow dissolution is due to the limited solubility of these products and the ground decomposition time up to absorbable forms for plants.

3. The Conventional coated fertilizers are fertilizers which are coated with a protective impermeable or semipermeable (Sulphur (SCU), synthetic polymers (PCF), organic materials (waxes) layer, which controls the release of nutrients rate.

4. Finally, inhibitors of urease and nitrification are compounds that inhibit bacterial action, slow down the urea to ammonia conversion and ammonium to nitrate, and decrease losses of N as leaching nitrate or by denitrification. Examples of these inhibitors are NBTPT urease inhibitor, Nitrapyrin nitrification inhibitor (use only in US), DCD nitrification inhibitor and DMPP nitrification inhibitor (more effective, better compatibility.

The DMPP delays the ammonium to nitrite bacterial oxidation, by inhibiting the action of the enzyme ammonia monooxygenase (AMO) nitrosomonas bacteria specific. It has a bacteriostatic not bactericidal effect, making their proliferation slower, producing a temporary increase of the ammonium in the ground at the expense of nitrate. Its advantages are: high-efficiency on Nitrosomonas bacteria inhibition, 4 to 10 weeks bacteriostatic effect, high selectivity since it only inhibits the Nitrosomonas bacteria, completely degrades in the ground, which is effective at very low doses, incorporating to all kinds of formulations, leaching minimal decreases, inhibits part of urea volatilization, it is non-toxic.

BACKGROUND ART

Taken from State of the art cited several examples of both liquid and dry in granules, pellets or powder fertilizers. For example, the U.S. Pat. No. 4,356,021 describes a liquid fertilizer composed of zinc oxide and ammonium thiosulfate. The U.S. Pat. No. 5,372,626 describes a composition comprising metal ions and citric acid applied to the plants roots; U.S. Pat. No. 5,997,600 describe fertilizer additives including chelates form metal ions, specifically metal oxides. Additionally, in the State of the art are cited several examples of slow-release fertilizers and coated fertilizers. For example, U.S. Pat. No. 5,435,821 describes an agent for vegetation improvement which comprises a mixture of a least a macronutrient or micronutrient, of slow release fertilizer, nitrogen fertilizer or a pesticide, which is then coated with a polymer sulfonated that acts as a controlled-release coating; U.S. Pat. No. 5,725,630 describes a liquid fertilizer preparation method that contains alkane acid, which is subsequently mixed with a granular adjuvant, producing a granular dry fertilizer. The U.S. Pat. No. 1,592,804 describes a fertilizer that includes water-soluble potassium meta phosphate and water-insoluble potassium meta phosphate. The insoluble potassium meta phosphate, is present as less than 100 micrometers thin or finely crystalized crystals, but they are not covered. U.S. Pat. No. 4,036,627 describe a nitrogen fertilizer in which urea is mixed without reacting with metilen-urea. Metilen-urea is a long chain polymer, which breaks down over time, but is not coated and, therefore, is a method to retard or prevent urea volatilization. The French patent FR 2.599.736 is a fertilizer that includes a mixture of woody materials, plant materials, animals derived materials, inorganic components and poliuronides. The fertilizer granules (woody materials) are coated with a single layer or double layer of resin that retards the granules decomposition. Another case is the Spanish Patent No. 2.288.416, which describes the preparation of a liquid fertilizer from the already vanquished fire extinguishers powder. After a process of water dilution, you get a final liquid where the, nitrogen, phosphorus and potassium nutrients are dissolved in it, one last example of the State of the art is the Spanish Patent No. 2.259,908 the invention consists in a procedure for obtaining dense gel fertilizer type by clay spatial dispersion, which falls within the chemical sector, and to its application in fertilizer industry. It's producing fertilizers or copper gel using a clay spatial dispersion by shear.

SUMMARY OF THE INVENTION

The present invention relates to a method for the preparation of a compound and the adjuvant or not liquid compound, which improves the efficiency and performance of ammonia nitrogen fertilizers and ammonium phosphoric acid, present in the ground, using a mixture of 3.5 DMP, water, amino acids, that after the process established in this innovation becomes 3.5 dimethyl-pyrazole liquid phosphate compound mixed fertilizer ammonia and built-in Nitrogens in the crops irrigation produces a Nitrosome slowdown, ground bacteria that decomposing the ammonium transforming it to nitrate. In this way, with the application of this liquid compound is achieved make this transformation slower, managing to increase the Nitrogen efficiency, which in its ammonia phase is low leaching, in contrast to the nitrates that are highly leachable and pollute groundwater producing pollution by nitrogen. The above is also applicable when using slurry resulting from livestock farms, as organic fertilizers, which are rich in nitrogen, which is mainly present in ammonia form. In addition, the amino acids present in the formulation of the product stimulate and facilitate the absorption of fertilizer by the crop root mass.

The main advantage of this product is that it is liquid, making it easy to use and mixed, in some cases, with various fertilizers, making it also easily applicable to crops that have dripping or spraying irrigation, that it can be applied directly to the ground where the root system of the plant is located.

DETAIL DESCRIPTION

The product of the present invention is intended to be used in agriculture, specifically in annual crops fertilization, fruit trees, meadows or directly to the ground, solving the existing problems, the ammonium into nitrate transformation speed among others. The action mode aims to decrease the nitrification process that converts the ammonium into nitrite and then to nitrate, which is usually very quick to become nitrate. As it will be later described, the compound of the invention acts in conjunction with fertilizers, making that the amount of available ground ammonium to be absorbed high for longer, which brings a number of benefits for the plant and the environment.

The result of the general formula of the present invention is as follows:

Dimethyl-pyrazole phosphate: between 6% and 19% by weight of the total

Phosphorus (P20): between 2% and 32% by total weight

Amino acids: between 1% and 15% by total weight

Water: until complete 100%

Mix generates as a result of the process also traces of the following elements:

Arsenic <1.0 ppm

Cadmium <0.7 ppm

Mercury <0.5 ppm.

Lead <8.0 ppm.

Example of preparation of the invention is based on the preparation of a total of 4,000 liters of fertilizer coadjuvant. An expert in the art will keep the order of addition of the components, which is important in the preparation of the mixture. It is also important to the type of mixer that is used, can be any other mixer that is suitable.

For the mixture preparation will be used a cylindrical container with a useful capacity of 4,000 liters. In this case it's a mechanical paddle mixer, with two paddles attached to the shaft, one located near the bottom of the container and the second located approximately in the middle of the length of that shaft. The container mixer will be fitted with baffles attached to the walls thereof; in addition the mixer wall is located in a tubular coil which is heated by means of steam to heat the contents of the container.

The preparation is placed in said mixing container between 2,400 and 3,600 kg of phosphoric acid and warming said load by steam to a temperature of between 127.4 F degrees and 197.6 F degrees (53° C. and 92° C.) with the agitation system running, add 380 and 550 kilos of 3.5DMP (3.5Dimetil-pyrazole). Then 500 liters of water are added, allowed to cool to between 77 F degrees and 122 F degrees (25° C. and 50° C.). At said temperature are added between 480 and 580 liters of amino acids, then completing the balance of the mixture with more water to reach the 4,000 liters of mixture, keeping the agitation until the mixture homogenization.

The mixture is allowed to cool until reach between 50 F degrees and 77 F degrees (10° C. and 25° C.). At said temperature the mixture is ready to be bottled. Packaging procedure is done by gravity directly from the container mixer, through suitable connections for the filling of 22 liters containers, plastic material containers in this case. The packaging process is concluded with thirty-two containers per pallet, wrapped in suitable packing material.

The invention claimed is:

1. A method to prepare a liquid compound to improve an efficiency of ammonium nitrogen fertilizers or ammonia from soil or ground to crops, comprises:
    combining between 6% and 19% by weight of the total of dimethyl pyrazole phosphate (3,5 DMP), between 2% and 32% by weight of the total of phosphorus ($P_2O$), between 1% and 15% by weight of the total of amino acids, and a remainder of water to form a mixture; and
    heating the mixture to form the liquid compound.

2. The method of preparing the liquid compound fertilizer according to claim 1, wherein the
    mixture comprises trace elements, comprising:
    less than 1.0 ppm Arsenic;
    less than 0.7 ppm Cadmium;
    less than 0.5 ppm Mercury; and
    less than 8.0 ppm Lead.

3. The method of claim 2, wherein the mixing is in a mixing tank.

4. The method of claim 3, wherein a capacity of the mixing tank is 4.000 liters and wherein the mixing tank is equipped with an agitation system, comprising:
    a mixer mechanical paddle stirrer:
    comprising two shaft paddles attached to the paddle stirrer, wherein one shaft paddle of the two shaft paddles is near the bottom of the container, and wherein the second shaft paddle of the two shaft paddles is located at approximately half the length of said paddle stirrer, and wherein the mixer is activated with a device; and baffles attached to walls thereof; and a coil, wherein the coil is heated by steam to heat the components of the mixing tank.

5. The method of claim 3, further comprising, preparing the 3,5 DMPP by:
    heating between 2,400 and 3,600 kg of phosphoric acid to a first temperature of between 50° C. and 90° C. to produce a heated phosphoric acid;
    mixing the heated phosphoric acid with the agitation system;
    adding between 480 and 600 kg of 3.5DMP (3,5Dimetilpyrazole)) to the heated phosphoric acid to form a pre-mix;
    adding water to the pre-mix;
    cooling the pre-mix to a second temperature to between 25° C. and 50° C.;
    adding between 480 and 580 liters of the amino acids at said second temperature;
    adding the remainder of the water so as to prepare 4,000 liters of the mixture; and
    stirring the mixture to form a homogeneous mixture.

6. The method of claim 5, further comprising:
    cooling the homogenous mixture to a third temperature between 10° C. and 25° C. to form a cooled homogenous mixture;
    packaging the cooled homogenous mixture by gravity directly from the mixing tank to at least one container; and
    palletizing said at least one container.

7. The method of claim 1, further comprising, preparing the liquid, comprising:
    heating the phosphoric acid to a first temperature of between 53° C. and 93° C. to produce a heated phosphoric acid;
    mixing the heated phosphoric acid with the agitation system;
    adding 3,5 DMP (3,5 Dimethyl-pyrazole) to the heated phosphoric acid to form a pre-mix;
    adding water to the pre-mix;
    cooling the pre-mix to a second temperature to between 25° C. and 50° C.;
    adding the amino acids at said second temperature;
    adding the remainder of the water to prepare the mixture; and
    mixing the mixture to form a homogeneous mixture.

8. The method of claim 7, wherein the homogenous mixture is cooled to a third temperature of between 10° C. and 25° C.

* * * * *